United States Patent
Park et al.

(10) Patent No.: US 10,883,019 B2
(45) Date of Patent: *Jan. 5, 2021

(54) CROSS-LINKABLE COMPOSITION

(71) Applicant: LG Chem, Ltd., Seoul (KR)

(72) Inventors: Hyoung Sook Park, Daejeon (KR); Ji Yeong Lee, Daejeon (KR); Se Woo Yang, Daejeon (KR); Hyun Hee Son, Daejeon (KR); So Ra Yoon, Daejeon (KR); Sul Ki Han, Daejeon (KR); Chang Ik Song, Daejeon (KR)

(73) Assignee: LG Chem, Ltd.

( * ) Notice: Subject to any disclaimer, the term of this patent is extended or adjusted under 35 U.S.C. 154(b) by 128 days.

This patent is subject to a terminal disclaimer.

(21) Appl. No.: 15/737,481

(22) PCT Filed: Jul. 11, 2016

(86) PCT No.: PCT/KR2016/007503
§ 371 (c)(1),
(2) Date: Dec. 18, 2017

(87) PCT Pub. No.: WO2017/010766
PCT Pub. Date: Jan. 19, 2017

(65) Prior Publication Data
US 2018/0179344 A1      Jun. 28, 2018

(30) Foreign Application Priority Data

Jul. 10, 2015  (KR) .................. 10-2015-0098206
Apr. 1, 2016   (KR) .................. 10-2016-0040353

(51) Int. Cl.
*C09J 7/38*      (2018.01)
*G02F 1/13*     (2006.01)
(Continued)

(52) U.S. Cl.
CPC ............ *C09J 7/385* (2018.01); *C08F 220/18* (2013.01); *C08G 18/003* (2013.01);
(Continued)

(58) Field of Classification Search
None
See application file for complete search history.

(56) References Cited

U.S. PATENT DOCUMENTS

| 5,106,874 | A  | 4/1992  | Porter et al. |
| 9,816,011 | B2 | 11/2017 | Kim et al.    |

(Continued)

FOREIGN PATENT DOCUMENTS

| CN | 1521230 A | 8/2004  |
| CN | 1872935 A | 12/2006 |

(Continued)

OTHER PUBLICATIONS

"Partial Translation of JP2009-242725 A" to Ikeda, pp. 1-26 (2009). (Year: 2009).*

(Continued)

*Primary Examiner* — Rachel Kahn
*Assistant Examiner* — Ha S Nguyen
(74) *Attorney, Agent, or Firm* — Lerner, David, Littenberg, Krumholz & Mentlik, LLP (57) ABSTRACT

The present application relates to a cross-linkable composition, and for example, to a cross-linkable composition which can form a membrane having an excellent interfacial adhesion with other layers and cause no detachment phenomenon when forming a membrane in a structure of a pressure-sensitive adhesive optical member or the like.

10 Claims, 1 Drawing Sheet

(51) Int. Cl.

| | | |
|---|---|---|
| C09J 11/06 | (2006.01) | |
| C08G 18/48 | (2006.01) | |
| C08G 18/50 | (2006.01) | |
| C08G 18/80 | (2006.01) | |
| C08G 18/24 | (2006.01) | |
| C08G 18/00 | (2006.01) | |
| C08G 18/40 | (2006.01) | |
| C08G 18/62 | (2006.01) | |
| C08G 18/08 | (2006.01) | |
| C08G 18/75 | (2006.01) | |
| C08G 18/76 | (2006.01) | |
| C08G 18/10 | (2006.01) | |
| C08G 18/32 | (2006.01) | |
| C08G 18/66 | (2006.01) | |
| C08K 5/00 | (2006.01) | |
| C08K 5/3412 | (2006.01) | |
| G02F 1/1335 | (2006.01) | |
| C08F 220/18 | (2006.01) | |
| C09J 133/08 | (2006.01) | |
| C08J 3/24 | (2006.01) | |
| C08G 18/28 | (2006.01) | |
| C08L 33/00 | (2006.01) | |
| C09J 4/00 | (2006.01) | |

(52) U.S. Cl.
CPC ......... *C08G 18/0852* (2013.01); *C08G 18/10* (2013.01); *C08G 18/246* (2013.01); *C08G 18/3206* (2013.01); *C08G 18/4063* (2013.01); *C08G 18/4833* (2013.01); *C08G 18/4837* (2013.01); *C08G 18/5045* (2013.01); *C08G 18/6216* (2013.01); *C08G 18/6254* (2013.01); *C08G 18/755* (2013.01); *C08G 18/7621* (2013.01); *C08G 18/8025* (2013.01); *C08G 18/8029* (2013.01); *C08J 3/24* (2013.01); *C08K 5/0025* (2013.01); *C08K 5/3412* (2013.01); *C09J 11/06* (2013.01); *C09J 133/08* (2013.01); *G02F 1/13* (2013.01); *G02F 1/133528* (2013.01); *C08F 220/1804* (2020.02); *C08G 18/242* (2013.01); *C08G 18/485* (2013.01); *C08G 18/4829* (2013.01); *C08G 18/6677* (2013.01); *C08G 2170/40* (2013.01); *C09J 2433/00* (2013.01)

(56) References Cited

U.S. PATENT DOCUMENTS

| | | | |
|---|---|---|---|
| 2005/0256251 A1 | 11/2005 | Amano et al. | |
| 2005/0266238 A1 | 12/2005 | Amano et al. | |
| 2006/0234074 A1 | 10/2006 | Yun et al. | |
| 2007/0087133 A1 | 4/2007 | Cho et al. | |
| 2009/0286950 A1 | 11/2009 | Schumann et al. | |
| 2011/0117296 A1 | 5/2011 | Jang et al. | |
| 2012/0321819 A1 | 12/2012 | Kim et al. | |
| 2013/0068386 A1 | 3/2013 | Lack et al. | |
| 2014/0016067 A1 | 1/2014 | Yoon et al. | |
| 2014/0016069 A1* | 1/2014 | Kim | C09J 133/04 349/96 |
| 2014/0030511 A1 | 1/2014 | Amano et al. | |
| 2014/0065415 A1 | 3/2014 | Sasaki et al. | |
| 2014/0147668 A1 | 5/2014 | Yamagata et al. | |
| 2014/0272408 A1 | 9/2014 | Amano et al. | |
| 2014/0322457 A1 | 10/2014 | Yasui et al. | |
| 2015/0010753 A1 | 1/2015 | Ha et al. | |

FOREIGN PATENT DOCUMENTS

| | | |
|---|---|---|
| CN | 101258214 A | 9/2008 |
| CN | 101638467 A | 2/2010 |
| CN | 101693820 A | 4/2010 |
| CN | 102884098 A | 1/2013 |
| CN | 103666360 A | 3/2014 |
| CN | 103827246 A | 5/2014 |
| EP | 1591506 A1 | 11/2005 |
| EP | 2246404 A1 | 11/2010 |
| EP | 2703422 A1 | 3/2014 |
| JP | S62086076 A | 4/1987 |
| JP | H10060404 A | 3/1998 |
| JP | H11315259 A | 11/1999 |
| JP | 2005126731 A | 5/2005 |
| JP | 2005179616 A | 7/2005 |
| JP | 2006016595 A | 1/2006 |
| JP | 2006182795 A | 7/2006 |
| JP | 20072112 A | 1/2007 |
| JP | 2009511705 A | 3/2009 |
| JP | 2009209257 A * | 9/2009 |
| JP | 2009242725 A * | 10/2009 |
| JP | 2011127130 A | 6/2011 |
| JP | 2011208106 A | 10/2011 |
| JP | 5019552 B2 | 9/2012 |
| JP | 2012224681 A | 11/2012 |
| JP | 2013100483 A | 5/2013 |
| JP | 2013107977 A | 6/2013 |
| JP | 2014111733 A | 6/2014 |
| JP | 2014515046 A | 6/2014 |
| KR | 20060108515 A | 10/2006 |
| KR | 20070076200 A | 7/2007 |
| KR | 100967264 B1 | 7/2010 |
| KR | 20100138855 A | 12/2010 |
| KR | 101134553 B1 | 4/2012 |
| KR | 20120106357 A | 9/2012 |
| KR | 101269074 B1 | 5/2013 |
| KR | 20130050879 A | 5/2013 |
| KR | 20140029254 A | 3/2014 |
| KR | 20140094499 A | 7/2014 |
| KR | 20140142127 A | 12/2014 |
| KR | 20140143006 A | 12/2014 |
| TW | 201333134 A | 8/2013 |
| TW | 201516123 A | 5/2015 |
| WO | 2011105877 A2 | 9/2011 |
| WO | 2011105877 A3 | 2/2012 |
| WO | WO-2012128596 A2 * | 9/2012 ............ C09J 133/04 |
| WO | 2012141099 A1 | 10/2012 |

OTHER PUBLICATIONS

Ballico, M., et al., "MultiPEGs: High Molecular Weight Multifunctional Poly(ethylene glycol)s Assembled by a Dentrimer-Like Approach." European Journal of Organic Chemistry, May 4, 2005, vol. 2005, No. 10, pp. 2064-2073.

Chemical Abstract Compound, STN Express, RN 1402405-02-0 (entered STN: Oct. 30, 2012).

Drioli, S., et al., "New Syntheses of Branched, Multifunctional High-Molecular Weight Poly(ethyiene glycol)s or (MultiPEG)s." The Open Organic Chemistry Journal, Feb. 27, 2008, vol. 2, No. 1, pp. 17-25.

Park et al., U.S. Appl. No. 15/737,565, filed Dec. 18, 2017, titled "Compound."

Park et al., U.S. Appl. No. 15/738,011, filed Dec. 19, 2017, titled "Cross-Linkable Composition."

Park et al., U.S. Appl. No. 15/738,023, filed Dec. 19, 2017, titled "Pressure-Sensitive Adhesive Polarizing Plate."

Search report from International Application No. PCT/KR2016/007502, dated Nov. 9, 2016.

Search report from International Application No. PCT/KR2016/007503, dated Oct. 26, 2016.

Search report from International Application No. PCT/KR2016/007505, dated Oct. 12, 2016.

Search report from International Application No. PCT/KR2016/007506, dated Oct. 27, 2016.

Search report from Taiwan Patent Application No. 105121764 dated Apr. 19, 2017.

Search Report from Taiwan Patent Application No. 105121765, dated Mar. 16, 2017.

(56) References Cited

OTHER PUBLICATIONS

Search report from Taiwant Paten Application No. 105121775, dated Apr. 24, 2017.
Ohinese Search Report for Application No. CN2016800402350 dated Dec. 28, 2018.
Extended European Search Report including Written Opinion for Application No. EP16824682.5 dated Jun. 6, 2018.
Extended European Search Report including Written Opinion for Application No. EP16824686.6 dated Jun. 4, 2018.
Kim, Ju Yeong., "Production of bridged organic silica precursor having amphiphilic polymeric chain for silicon/amphiphilic polymer composite nanoparticles", Database CA [Online], Chemical Abstracts Service, Columbus, OH, Oct. 30, 2012, XP002781182.
Chinese Search Report for Application No. CN2016800400482 dated Dec. 20, 2019, 1 page.
Chinese Search Report for Application No. CN201680040234.6 dated Jan. 6, 2020, 1 page.
Chinese Search Report for Application No. CN 201680039922.0 dated Dec. 4, 2019, 1 page.

* cited by examiner

CROSS-LINKABLE COMPOSITION

CROSS-REFERENCE TO RELATED APPLICATIONS

The present application is a national phase entry under 35 U.S.C. § 371 of International Application No. PCT/KR2016/007503, filed on Jul. 11, 2016, which claims priority from Korean Patent Application No. 10-2015-0098206, filed on Jul. 10, 2015, and Korean Patent Application No. 10-2016-0040353, filed on Apr. 1, 2016, the disclosures of which are incorporated herein by reference.

TECHNICAL FIELD

The present application relates to a cross-linkable composition.

BACKGROUND

Cross-linkable compositions are being utilized in a diversity of fields. For example, a pressure-sensitive adhesive or an adhesive may be applied to attach a protective film or an optical member to elements such as a liquid crystal display (LCD) panel in order to prevent an optical member such as a polarizing plate, other plastic products, household appliances, automobiles or the like from the attachment of contaminants such as dust or the occurrence of scratches, and here, this pressure-sensitive adhesive or adhesive may be formed of a cross-linkable composition.

An optical member that has a pressure-sensitive adhesive layer formed in advance on one surface thereof by using a pressure-sensitive adhesive composition among cross-linkable compositions, is called a pressure-sensitive adhesive optical member. For example, as disclosed in Patent Document 1, this pressure-sensitive adhesive optical member typically has a structure including a pressure-sensitive adhesive layer formed on one surface of a supporting substrate such as a polarizing plate, a polarizer or the like.

In the pressure-sensitive adhesive optical member as described above, adhesion between the supporting substrate such as a polarizing plate and the pressure-sensitive adhesive layer has to be ensured, and also, the occurrence of detachment of the pressure-sensitive adhesive should be suppressed.

PRIOR ART DOCUMENT

Patent Document (Patent Document 1) Japanese patent No. 5019552

CONTENTS

Technical Object

The present application relates to a cross-linkable composition, and for example, to a cross-linkable composition which can form a membrane having an excellent interfacial adhesion with other layers and cause no detachment phenomenon when forming a membrane in a structure of a pressure-sensitive adhesive optical member or the like.

Technical Solution

The cross-linkable composition of the present application includes an acrylic pressure-sensitive adhesive resin; a crosslinking agent for the acrylic pressure-sensitive adhesive resin; and a polyalkylene polyol compound. The cross-linkable composition may be cross-linked by a cross-linking reaction between the acrylic pressure-sensitive adhesive resin and a crosslinking agent for the pressure-sensitive adhesive resin as a main cross-linking reaction. The inventors of the present invention determined that when the cross-linking reaction occurs too quickly in the process of forming a membrane by a cross-linkable composition, the interfacial adhesion between the membrane thus formed and another membrane is not suitably secured. Accordingly, in the present application, it was found that by designing a polyalkylene polyol compound included in the cross-linkable composition to appropriately suppress the cross-linking reaction, a speed of a cross-linking reaction is suitably controlled, and thereby the cross-linkable composition can form a membrane having a good interfacial adhesion with another membrane and no detachment phenomenon or the like.

The term "polyalkylene polyol compound" in the present specification refers to a compound that has a polyalkylene oxide unit and 3 or more hydroxyl groups. In the above description, a hydroxyl group may be present at an end of a polyalkylene polyol compound.

In the present specification, unless specifically stated otherwise, when a measurement temperature may affect its resulting value, the corresponding resulting value is a value measured at room temperature. The term "room temperature" used herein is a natural temperature which is not increased or decreased, and may be approximately in a range of 10 to 30, or 23 or 25° C.

An acrylic pressure-sensitive adhesive resin included in a cross-linkable composition is a polymer which includes an acrylic monomer as a main component and which can exhibit pressure-sensitive adhesive properties before or after crosslinking. In the above description, the acrylic monomer may be acrylic acid or methacrylic acid, a derivative of the acrylic acid or methacrylic acid, and for example, may be acrylic acid ester or methacrylic acid ester. Furthermore, in the present application, being included as a main component denotes that a weight ratio of the corresponding component is 55% or more, 60% or more, 65% or more, 70% or more, 75% or more, 80% or more, 85% or more or 90% or more. In another embodiment, the weight ratio of the component included as a main component may be 100% or less, or less than 100%.

The acrylic pressure-sensitive adhesive resin may be included as a main component in a cross-linkable composition. That is, a weight ratio of the acrylic pressure-sensitive adhesive resin may be 55% or more, 60% or more, 65% or more, 70% or more, 75% or more, 80% or more, 85% or more or 90% or more based on the total solid content of the cross-linkable composition. In another embodiment, the resin may also have a weight ratio of 100% or less or less than 100% based on the total solid content of the cross-linkable composition.

As the acrylic pressure-sensitive adhesive resin, for example, an acrylic pressure-sensitive adhesive resin having a carboxyl group may be used. The inventors of the present invention confirmed that a pressure-sensitive adhesive resin with a carboxyl group used as a cross-linkable component is advantageous for satisfying an energy relationship to be described below.

Furthermore, this acrylic pressure-sensitive adhesive resin may improve the durability of the cross-linkable composition under heat resistant and moisture-heat resistant conditions, and in the case where an ionic compound to be described below is added, a membrane with little change in surface resistance over time due to the compound may be formed. Also, a pressure-sensitive adhesive optical member applied in particular to a so-called vertical alignment (VA) mode of an LCD can obtain a good effect by using the acrylic pressure-sensitive adhesive resin.

In one embodiment, the acrylic pressure-sensitive adhesive resin may have an acid value of 20 or more. In the above description, the acid value represents the number of milligrams of potassium hydroxide required to neutralize a free fatty acid or resin acid included in 1 g of a sample. In another embodiment, the acid value of the resin may be about 25 or more or about 30 or more. Moreover, in another embodiment, the acid value of the resin may be about 50 or less, about 45 or less, about 40 or less or about 35 or less. The effect according to the inclusion of a carboxyl group can be further enhanced by applying the resin with the above-described acid value.

As an acrylic pressure-sensitive adhesive resin, for example, a polymer having a polymerization unit of a (meth)acrylic acid ester monomer and a polymerization unit of an acidic monomer may be used. In the present specification, the term "polymerization unit" may refer to a state in which the corresponding monomer is forming a backbone of a polymer by a polymerization reaction.

In the above description, as a (meth)acrylic acid ester compound, for example, an alkyl (meth)acrylate may be used, and an alkyl (meth)acrylate with an alkyl group having 2 to 12 carbon atoms may be used in consideration of control of a cohesive force, a glass transition temperature, pressure-sensitive adhesive properties and the like. Examples of this monomer include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethyl hexyl (meth) acrylate, 2-ethylbutyl (meth)acrylate, n-octyl (meth)acrylate, isobornyl (meth)acrylate, isooctyl (meth)acrylate, isononyl (meth)acrylate, lauryl (meth)acrylate or the like, and one or two or more thereof may be included in a polymer.

For example, the acrylic pressure-sensitive adhesive resin may include an acidic monomer as a polymerization unit. The term "acidic monomer" refers to a polymerizable monomer having an acidic group, and for example, a monomer having a carboxyl group may be used. In the above description, examples of the monomer having a carboxyl group include (meth)acrylic acid, 2-(meth)acryloyloxy acetic acid, 3-(meth)acryloyloxy propionic acid, 4-(meth)acryloyloxy butyric acid, an acrylic acid dimer, itaconic acid, maleic acid, maleic anhydride or the like, but are not limited thereto.

The acrylic pressure-sensitive adhesive resin may include an acidic monomer as a polymerization unit at about 5 parts by weight or more, 5.5 parts by weight or more or 6 parts by weight or more based on 100 parts by weight of the (meth)acrylic acid ester compound. In the present specification, the term "parts by weight" may refer to a weight ratio between the components, unless specifically stated otherwise. In another embodiment, the acidic monomer may be included in a ratio of about 20 parts by weight or less, about 15 parts by weight or less or about 10 parts by weight or less.

As necessary, the acrylic pressure-sensitive adhesive resin may include an additional polymerization unit of a monomer such as a hydroxyl group-containing monomer such as hydroxyalkyl (meth)acrylates such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate or the like or hydroxy alkylene glycol (meth)acrylates such as 2-hydroxyethylene glycol (meth)acrylate, 2-hydroxypropylene glycol (meth) acrylate or the like; a nitrogen-containing monomer such as (meth)acrylonitrile, (meth)acrylamide, N-methyl (meth) acrylamide, N-butoxymethyl (meth)acrylamide, N-vinyl pyrrolidone, N-vinyl caprolactam or the like; an alkylene oxide group-containing monomer such as alkoxy alkyleneglycol (meth)acrylic acid ester, alkoxy dialkyleneglycol (meth)acrylic acid ester, alkoxy trialkyleneglycol (meth) acrylic acid ester, alkoxy tetraalkyleneglycol (meth)acrylic acid ester, alkoxy polyethylene glycol (meth)acrylic acid ester, phenoxy alkyleneglycol (meth)acrylic acid ester, phenoxy dialkyleneglycol (meth)acrylic acid ester, phenoxy trialkyleneglycol (meth)acrylic acid ester, phenoxy tetraalkyleneglycol (meth)acrylic acid ester, phenoxy polyalkylene glycol (meth)acrylic acid ester or the like; a styrene-based monomer such as styrene or methyl styrene; a glycidyl group-containing monomer such as glycidyl (meth)acrylate; carboxylic acid vinyl esters such as vinyl acetate, etc.

This acrylic pressure-sensitive adhesive resin may be prepared using a typical polymerization method, for example, by applying a monomer mixture prepared by mixing suitable monomers in accordance with a desired monomer composition to a solution polymerization method. In this process, as necessary, a suitable polymerization initiator, a molecular weight regulator, a chain transfer agent or the like may be used together.

The cross-linkable composition may additionally include a crosslinking agent, specifically a crosslinking agent enabling the pressure-sensitive adhesive resin to be cross-linked. An example of the crosslinking agent includes a compound having two or more functional groups that can react with a carboxyl group included in the acrylic pressure-sensitive adhesive resin. As such a cross-linking agent, a cross-linking agent commonly used in the art such as an epoxy-based cross-linking agent or an aziridine-based cross-linking agent may be utilized. Specifically, one or more selected from the group consisting of ethyleneglycol diglycidylether, triglycidylether, trimethylolpropane triglycidylether, N,N,N',N'-tetraglycidyl ethylenediamine, glycerin diglycidylether, N,N'-toluene-2,4-bis(1-aziridinecarboxamide), N,N'-diphenylmethane-4,4'-bis(1-aziridinecarboxamide), triethylene melamine, bisisoprothaloyl-1-(2-methyl-aziridine) and tri-1-aziridinylphosphineoxide may be exemplified, but the present application is not limited thereto. Such a crosslinking agent may be included in an amount of 0.0001 to 15 parts by weight based on 100 parts by weight of the acrylic pressure-sensitive adhesive resin in the cross-linkable composition, but is not limited thereto. In another embodiment, the ratio of the crosslinking agent may be about 0.0005 parts by weight or more or about 0.001 parts by weight or more. In another embodiment, the ratio of the crosslinking agent may be 13 parts by weight or less, 11 parts by weight or less, 9 parts by weight or less, 7 parts by weight or less, 5 parts by weight or less, 3 parts by weight or less, 1 part by weight or less, 0.5 parts by weight or less, 0.1 parts by weight or less or 0.05 parts by weight or less.

The cross-linkable composition may additionally include an ionic compound, as necessary. In the above description, an ionic compound with an octanol-water partition coefficient (Log P) of 4 or more may be selected as the ionic compound. An octanol-water partition coefficient is a coefficient representing solute distribution in two immiscible octanol and water phases. When an ionic compound with the octanol-water partition coefficient of 4 or more is mixed with a cross-linkable composition, a cross-linkable composition having antistatic properties stably maintained without change in surface resistance over time under high-humidity conditions or high-temperature and high-humidity conditions can be provided. In another embodiment, the octanol-water partition coefficient may be 4.5 or more, 5 or more or 5.5 or more. The higher the octanol-water partition coefficient is, the higher the stability of the ionic compound to be ensured under high-humidity or high-humidity conditions is, and thus the upper limit thereof is not particularly limited. In one embodiment, the octanol-water partition coefficient may be 30 or less, 25 or less, 20 or less or 15 or less.

The ionic compound may also include a cation with cation-water binding energy in a range of 0 to 0.6 Kcal/mol. The binding energy within this range is advantageous for securing the stability of the ionic compound under high-humidity conditions or high-temperature and high-humidity conditions. In another embodiment, the cation-water binding energy may be approximately in the range of 0 to 0.55 Kcal/mol, 0.1 to 0.55 Kcal/mol, 0.2 to 0.55 Kcal/mol or 0.3 to 0.55 Kcal/mol.

As the ionic compound, any known compound is usable as long as the compound has an octanol-water partition coefficient within the above-described range, and cation-water binding energy within the above-described range as necessary, without particular limitation.

In one embodiment, an ionic compound including a cation of the following Formula 7 may be used as the ionic compound.

[Formula 7]

where $R_1$ represents an alkyl group having 1 to 3 carbon atoms, and $R_2$ to $R_4$ each independently represent an alkyl group having 4 to 20 carbon atoms.

In Formula 7, $R_1$ to $R_4$ may represent a linear, branched or cyclic alkyl group, and preferably a linear alkyl group. Also, the alkyl group may be arbitrarily substituted with another substituent such as an alkyl group or the like.

In another embodiment, in Formula 7, $R_2$ to $R_4$ each may independently represent an alkyl group having 4 to 16, 4 to 12 or 4 to 8 carbon atoms.

The cation as described above has a structure where a nitrogen atom is bonded to four alkyl groups, and three alkyl groups among them are long chain alkyl groups having 4 or more carbon atoms, and the cation with such a structure is advantageous for securing the octanol-water partition coefficient and the cation-water binding energy within the aforementioned ranges.

Examples of a cation of Formula 7 include N-methyl-N,N,N-tributylammonium, N-ethyl-N,N,N-tributylammonium, N-methyl-N,N,N-trihexyl ammonium, N-ethyl-N,N,N-trihexyl ammonium, N-methyl-N,N,N-trioctyl ammonium, N-ethyl-N,N,N-trioctyl ammonium or the like, but are not limited thereto.

Examples of an anion included in the ionic compound include fluoride ($F^-$), chloride ($Cl^-$), bromide ($Br^-$), iodide ($I^-$), perchlorate ($ClO4^-$), hydroxide ($OH^-$), carbonate ($CO_3^{2-}$), nitrate ($NO_3^-$), trifluoromethane sulfonate ($CF_3SO_3^-$), sulfonate ($SO_4^-$), hexafluorophosphate ($PF_6^-$), methyl benzene sulfonate ($CH_3(C_6H_4)SO_3^-$), p-toluene-sulfonate ($CH_3C_6H_4SO^{3-}$), tetraborate ($B_4O_7^{2-}$), carboxy benzene sulfonate ($COOH(C_6H_4)SO_3^-$), trifluoromethane sulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzyl borate ($B(C_6H_5)_4^-$), tris(pentafluoroethyl)trifluorophosphate ($P(C_2F_5)_3F_3^-$), etc.

In one embodiment, the ionic compound may include an anion represented by the following Formula 8 or bis(fluorosulfonyl)imide.

[Formula 8]

where X represents a nitrogen atom or a carbon atom, Y represents a carbon atom or a sulfur atom, $R_f$ represents a perfluoroalkyl group, m is 1 or 2 and n is 2 or 3.

In Formula 8, when Y is carbon, m may be 1, when Y is sulfur, m may be 2, when X is nitrogen, n may be 2, and when X is carbon, n may be 3.

The anion of Formula 8 or bis(fluorosulfonyl)imide exhibits a high electronegativity due to a perfluoroalkyl ($R_f$) group or a fluoro group, and includes a unique resonance structure, which forms a weak bond with a cation, thereby having hydrophobicity. Accordingly, the ionic compound may exhibit excellent compatibility with another component of the composition such as a polymer, and may provide a high antistatic ability with a small amount.

$R_f$ of Formula 8 may be a perfluoroalkyl group having 1 to 20, 1 to 12, 1 to 8 or 1 to 4 carbon atoms. In this case, the perfluoroalkyl group may have a linear, branched or cyclic structure. The anion of Formula 8 may be a sulfonyl methide-based, sulfonyl imide-based, carbonyl methide-based or carbonyl imide-based anion, and specifically, one or a mixture of two or more of tristrifluoromethanesulfonyl methide, bistrifluoromethanesulfonyl imide, bisperfluorobutanesulfonyl imide, bispentafluoroethanesulfonyl imide, tristrifluoromethanecarbonyl methide, bisperfluorobutanecarbonyl imide, bispentafluoroethanecarbonyl imide, etc.

The ratio of the ionic compound in the cross-linkable composition is not particularly limited, and may be adjusted to a suitable range in consideration of desired antistatic properties or the like.

The ionic compound may not substantially form a chelate with the polyalkylene polyol compound in the cross-linkable composition as described above. Furthermore, the polyalkylene polyol compound may have a higher affinity to an acrylic pressure-sensitive adhesive resin than the ionic compound in the cross-linkable composition.

The polyalkylene polyol compound included in the cross-linkable composition may be selected to exhibit a binding or mixing energy which will be described below with the acrylic pressure-sensitive adhesive resin, crosslinking agent and ionic compound.

Although not particularly limited, the inventors of the present invention found that an energy relationship to be described below can be more easily satisfied by controlling the number of hydroxyl groups and the molecular weight of a polyalkylene polyol compound which is a compound with a polyalkylene oxide unit.

The term "polyalkylene oxide or polyalkylene glycol" as used herein may refer to an object including two or more alkylene oxide units with a linear or branched alkylene group having 2 to 12 carbon atoms. In the above description, the alkylene group may have 2 to 8, 2 to 4 or 2 or 3 carbon atoms.

In the present application, a specific example of a polyalkylene oxide includes a polyethylene oxide or a polypropylene oxide, and a specific example of a polyalkylene glycol includes a polyethylene glycol or a polypropylene glycol.

In the present application, a compound having a polyethylene oxide unit and/or a polypropylene oxide unit may be used as the polyalkylene polyol compound.

The polyalkylene polyol compound may be, for example, a compound with 3 or more hydroxyl groups such as 3 or more terminal hydroxyl groups. The number of hydroxyl groups, for example, the number of terminal hydroxyl groups included in the polyalkylene polyol compound may be 30 or less, 25 or less, 20 or less, 15 or less, 10 or less or 5 or less.

Further, a polymer compound having a molecular weight of 10,000 or more may be used as the polyalkylene polyol compound. In the present application, the term "weight average molecular weight" refers to a conversion value with respect to the standard polystyrene measured by gel permeation chromatography (GPC). Unless specifically stated otherwise, the term "molecular weight" used herein refers to weight average molecular weight. In another embodiment, the molecular weight may be 100,000 or less, 90,000 or less, 80,000 or less, 70,000 or less, 60,000 or less, 50,000 or less or 40,000 or less.

In the present application, an energy relationship can be satisfied more suitably by selecting the aforementioned polyalkylene polyol compound.

A suitable polyalkylene polyol compound in the present application may be, but is not limited to, a compound represented by the following Formula 1.

[Formula 1]

where A is a core including a polyalkylene oxide unit, B is a chain connected to the core (A) and including a polyalkylene oxide unit, m is an integer of 1 or more, n is an integer of 0 or more, and the sum (m+n) of m and n is 3 or more.

In one embodiment, a core (A) of the Formula 1 may be a core derived from a polyalkylene polyol. For example, the compound of Formula 1 may be formed by adding a chain (B) of Formula 1 by the medium of one or more hydroxyl groups at an end of the polyalkylene polyol compound. The polyalkylene polyol compound forming the core (A) may be a triol or higher polyol, that is, a compound including 3 or more terminal hydroxyl groups, and the chain (B) may be added by the medium of at least one hydroxyl group among them. The polyalkylene polyol compound forming the core (A) may include 3 or more terminal hydroxyl groups. The number of hydroxyl groups included in the polyalkylene polyol compound may be 30 or less, 25 or less, 20 or less, 15 or less, 10 or less or 5 or less. Accordingly, the sum of n and m (n+m) in Formula 1 may be 3 or more, and also, may be 30 or less, 25 or less, 20 or less, 15 or less, 10 or less or 5 or less.

On the other hand, the compound of Formula 1 may also be a polyalkylene polyol compound, as a compound including a polyalkylene oxide unit as well as 3 or more hydroxyl groups.

Furthermore, details on a molecular weight of a core (A) in Formula 1 and the inclusion form of a polyethylene oxide and polypropylene oxide or the like in a core (A) in Formula 1 to be described below may be a molecular weight of the polyalkylene polyol compound forming the core (A), and the inclusion form of a polyethylene oxide and a polypropylene oxide in the polyalkylene polyol compound forming the core (A).

In the compound of Formula 1, the core (A) may have a weight average molecular weight in a range of 1,000 to 40,000. In another embodiment, the molecular weight of the core (A) may be in a range of 2,000 or more, 3,000 or more, 4,000 or more, 5,000 or more or 6,000 or more. Also, in another embodiment, the core (A) may have a molecular weight of 35,000 or less, 30,000 or less, 25,000 or less, 20,000 or less, 15,000 or less, 10,000 or less or about 9,000 or less.

In the compound of Formula 1, the core (A) may include a polyethylene oxide unit or a polypropylene oxide unit, and in one embodiment, may include both of the units. When the core (A) includes both of the units, a ratio (P/E) of a number of moles (P) of the polypropylene oxide unit to a number of moles (E) of the polyethylene oxide unit in the core may be in a range of 1 to 10 in the compound of Formula 1. In another embodiment, the ratio (P/E) may be 1.5 or more, 2 or more, 2.5 or more, 3 or more, 3.5 or more or 4 or more. In another embodiment, the ratio (P/E) may be 9.5 or less, 9 or less, 8.5 or less, 8 or less, 7.5 or less, 7 or less, 6.5 or less, 6 or less, 5.5 or less or about 5 or less.

As the aforementioned polyalkylene polyol compound which can form the core, for example, polyalkylene polyol compounds known as KPX PP-2000, KPX PP-2600, KPX GP-4000, KPX-GP-5000, KPX-HP3753 or the like may be exemplified, but the present application is not limited thereto.

In Formula 1, the core (A) and the chain (B) each may include one or more polyalkylene oxide units.

In the above description, a specific form of the polyalkylene oxide unit is as described above.

This polyalkylene oxide unit may be, for example, represented by the following Formula 3.

[Formula 3]

where L may be a linear or branched alkylene group having 2 to 12, 2 to 8 or 2 to 4 carbon atoms, or a linear or branched alkylene group having 2 or 3 carbon atoms as described above.

In the compound of Formula 1, the chain (B) added to the core (A) may be, for example, represented by the following Formula 2.

[Formula 2]

where $A_1$ to $A_3$ each independently represent an alkylene group, $Q_1$ and $Q_2$ represent an aliphatic or aromatic divalent residue, $L_1$ to $L_4$ represent linkers, x is an integer of 1 or more, y is an integer of 0 or more, and z is an integer of 1 or more.

In Formula 2, $L_1$ may be bonded to the core (A).

In Formula 2, an alkylene group may be, for example, a linear or branched alkylene group having 2 to 12, 2 to 8 or 2 to 4 carbon atoms. For example, the alkylene group may be an ethylene group or a propylene group. The alkylene group may be arbitrarily substituted with one or more substituents.

In Formula 2, $A_1$ or $A_2$ and an oxygen atom connected thereto (a repeating unit defined by x or z) may form a polyalkylene oxide unit of Formula 3.

In Formula 2, the type of linkers of $L_1$ to $L_4$ is not particularly limited, and for example, may be an oxygen atom, a sulfur atom, an alkylene group, an alkenylene group or an alkynylene group, or may be a linker represented by the following Formula 4 or 5. In the above description, the alkylene group may be a linear or branched alkylene group having 1 to 20, 1 to 16, 1 to 12, 1 to 8 or 1 to 4 carbon atoms, and the alkenylene group or the alkynylene group may be a linear or branched alkenylene group or an alkynylene group having 2 to 20, 2 to 16, 2 to 12, 2 to 8 or 2 to 4 carbon atoms.

[Formula 4]

[Formula 5]

where $R_1$ and $R_2$ each independently represent a hydrogen atom or an alkyl group.

In Formulas 4 and 5, the alkyl group may be, for example, a linear, branched or cyclic alkyl group having 1 to 20, 1 to 16, 1 to 12, 1 to 8 or 1 to 4 carbon atoms, and this alkyl group may be arbitrarily substituted with one or more substituents.

In Formula 2, the alicyclic or aromatic divalent residue may be a divalent residue derived from an alicyclic compound or an aromatic compound.

In the above description, the aromatic compound may refer to a compound with a structure in which one benzene or two or more benzene rings are bonded to one another by sharing one or two carbon atoms thereof, a compound with a structure in which two or more benzene rings are bonded to one another by any linker or derivatives thereof. The aromatic compound may be, for example, a compound having 6 to 30, 6 to 25, 6 to 21, 6 to 18 or 6 to 13 carbon atoms.

In the above description, the alicyclic compound refers to a compound with a cyclic hydrocarbon structure and not a compound with an aromatic ring structure. Unless specifically stated otherwise, the alicyclic compound may be, for example, a compound having 3 to 30, 3 to 25, 3 to 21, 3 to 18 or 3 to 13 carbon atoms.

In Formula 2, the structure of $-L_1-Q_1-L_2-$ or $-L_3-Q_2-L_4-$ may be a structure derived from a diisocyanate compound.

In the above description, examples of the diisocyanate compound include tolylene diisocyanate, xylene diisocyanate, diphenylmethane diisocyanate, hexamethylene diisocyanate, isophorone diisocyanate, tetramethylxylene diisocyanate, naphthalene diisocyanate, or the like, but are not limited thereto.

In one embodiment, the chain (B) of the compound of Formula 1 may be represented by the following Formula 6.

[Formula 6]

where $A_1$ to $A_3$ each independently represent an alkylene group, $Q_1$ and $Q_2$ represent an aliphatic or aromatic divalent residue, x is an integer of 1 or more, y is an integer of 0 or more, and z is an integer of 1 or more.

The structure of Formula 6 is a structure where linkers $L_1$ to $L_4$ of Formula 2 are specified by Formula 4 or 5.

Thus, details of an alkylene group, a divalent residue or a linker in Formula 6 may be the same as that of Formula 2.

Furthermore, in Formulas 2 and 6, a specific range of x, y and z is not particularly limited, and for example, x, y and z may be selected within the range where the compound of Formula 1 can have a molecular weight to be described below.

The compound of Formula 1 may be, for example, prepared by reacting a chain obtained by a reaction between a polyalkylene glycol compound and a diisocyanate compound with the aforementioned polyalkylene polyol compound which forms the core (A) and includes three or more terminal hydroxyl groups.

For example, as a reaction for preparation of the chain, when a polyethylene glycol is reacted with isophorone diisocyanate, a precursor of a chain with a structure in which one end is a hydroxyl group and another end is an isocyanate group as represented in the following Formula A may be obtained.

[Formula A]

For example, when the precursor of the chain of Formula A is reacted with a triol compound of the following Formula B such that all hydroxyl groups of a triol of Formula B are reacted with an isocyanate group of an end of the chain of Formula A to add the chain, a compound having a structure as represented in the following Formula C may be formed. In this case, P in the following Formulas B and C may be the core (A) of Formula 1.

[Formula B]

[Formula C]

This compound of Formula 1 may include 3 moles or more of a hydroxyl group. In another embodiment, the number of moles of the hydroxyl group included in the compound of Formula 1 may be 30 or less, 25 or less, 20 or less, 15 or less, 10 or less or 5 or less.

In another embodiment, the compound of Formula 1 may have a hydroxyl value of 4 mgKOH/g or more. In another embodiment, a hydroxyl value may be 30 mgKOH/g or less, 25 mgKOH/g or less, 20 mgKOH/g or less or 15 mgKOH/g or less.

In the above description, the hydroxyl value may be calculated according to ASTM E222-10 (a standard test method for hydroxyl groups using acetic anhydride).

The compound of Formula 1 may be a polymer compound having a molecular weight of 10,000 or more. In another embodiment, the molecular weight may be 100,000 or less, 90,000 or less, 80,000 or less, 70,000 or less, 60,000 or less, 50,000 or less or 40,000 or less.

The ratio of the polyalkylene polyol compound in the cross-linkable composition is not particularly limited, and may be suitably adjusted considering a desired interfacial adhesion improvement effect or the like. For example, the polyalkylene polyol compound may be included at 0.01 parts by weight or more based on 100 parts by weight of the acrylic pressure-sensitive adhesive resin. In another embodiment, the ratio of the polyalkylene polyol compound may be about 0.02 parts by weight or more, about 0.03 parts by weight or more or about 0.04 parts by weight or more. Further, in another embodiment, the ratio of the polyalkylene polyol compound may be about 10 parts by weight or less, about 9 parts by weight or less, about 8 parts by weight or less, about 7 parts by weight or less, about 6 parts by weight or less, about 5 parts by weight or less, about 4 parts by weight or less, about 3 parts by weight or less, about 2 parts by weight or less, about 1 part by weight or less, about 0.5 parts by weight or less, about 0.4 parts by weight or less, about 0.3 parts by weight or less, about 0.2 parts by weight or less or about 0.1 parts by weight or less.

Each of the components in the present application may be selected to have their energy relationship to be as follows.

For example, in the present application, a binding energy (A) between the polyalkylene polyol compound and the acrylic pressure-sensitive adhesive resin may be controlled to be lower than a binding energy (B) between the cross-linking agent and the acrylic pressure-sensitive adhesive resin in the composition. By such control, an affinity of the polyalkylene polyol compound for the acrylic pressure-sensitive adhesive resin may be higher than an affinity of the acrylic pressure-sensitive adhesive resin for the crosslinking agent, and thereby a cross-linking speed can be adjusted by the polyalkylene polyol compound.

In one embodiment, a difference (B−A) between the binding energy (B) between the crosslinking agent and the acrylic pressure-sensitive adhesive resin and the binding energy (A) between the polyalkylene polyol compound and the acrylic pressure-sensitive adhesive resin may be 2 Kcal/mol or more, 2.2 Kcal/mol or more or 2.3 Kcal/mol or more. Moreover, in another embodiment, a difference (B−A) between the binding energies may be 20 Kcal/mol or less, 18 Kcal/mol or less, 16 Kcal/mol or less, 14 Kcal/mol or less, 12 Kcal/mol or less, 10 Kcal/mol or less, 8 Kcal/mol or less, 6 Kcal/mol or less, 4 Kcal/mol or less or 3.5 Kcal/mol or less. The polyalkylene polyol compound can suitably adjust the speed of a cross-linking reaction by the difference in the binding energy as described above.

In the above description, the binding energy (B) between the crosslinking agent and the acrylic pressure-sensitive adhesive resin may be −7 Kcal/mol or more. In another embodiment, the binding energy (B) may be about −1 Kcal/mol or less, −2 Kcal/mol or less, −3 Kcal/mol or less, −4 Kcal/mol or less or −5 Kcal/mol or less.

Furthermore, the binding energy (A) between the polyalkylene polyol compound and the acrylic pressure-sensitive adhesive resin may be less than −7 Kcal/mol. In another embodiment, the binding energy (A) may be about −7.5 Kcal/mol or less or −8 Kcal/mol or less. Moreover, in another embodiment, the binding energy (A) may be about −20 Kcal/mol or more, −18 Kcal/mol or more, −16 Kcal/mol or more, −14 Kcal/mol or more, −12 Kcal/mol or more, −10 Kcal/mol or more or about −9 Kcal/mol or more.

The polyalkylene polyol compound can appropriately adjust the speed of a cross-linking reaction with the binding energy as described above.

Further, the ionic compound may not substantially form a chelate with the polyalkylene polyol compound in the cross-linkable composition. That is, when the ionic compound has a high affinity for the polyalkylene polyol compound, the polyalkylene polyol compound required to suppress or adjust a cross-linking reaction between an acrylic pressure-sensitive adhesive resin and a crosslinking agent cannot properly perform its function due to the ionic compound.

To this end, the ionic compound may be selected such that a mixing energy between the ionic compound and an ethylene oxide unit is −2 Kcal/mol or more. In another embodiment, the mixing energy may be −1.8 Kcal/mol or more, −1.6 Kcal/mol or more, −1.4 Kcal/mol or more or about −1.2 Kcal/mol or more. Furthermore, the mixing energy may be about −0.1 Kcal/mol or less, about −0.2 Kcal/mol or less, −0.3 Kcal/mol or less, −0.4 Kcal/mol or less, −0.5 Kcal/mol or less, −0.6 Kcal/mol or less, −0.7 Kcal/mol or less or about −0.8 Kcal/mol or less.

The mixing energy is a mixing energy calculated between the ionic compound and one mole of the ethylene oxide unit. As described above, a polyalkylene polyol compound as a cross-linking speed regulator includes a polyalkylene oxide unit. Thus, a mixing energy between an ionic compound and an ethylene oxide unit may represent the affinity between the ionic compound and the polyalkylene polyol compound (cross-linking speed regulator). By controlling a mixing energy between an ionic compound and an ethylene oxide unit as described above, the ionic compound may be prevented from interfering with the adjustment of a cross-linking speed by the polyalkylene polyol compound.

A method of controlling the energy states between the components included in the cross-linkable composition as above is not particularly limited. For example, components may be selected and combined from known components of the cross-linkable composition to have the aforementioned binding energy or mixing energy.

In addition to the aforementioned components, the cross-linkable composition may further include other components according to use.

For example, the cross-linkable composition may additionally include an isocyanate compound. For example, this compound may serve to increase the adhesion with an optical member when the cross-linkable composition is applied to an optical member that will be described below. Specific examples of the isocyanate-based compound include one or more selected from the group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate and reactants thereof with polyols such as trimethylolpropane, but are not limited thereto. Such an isocyanate-based compound may be included in an amount of 0.01 to 10 parts by weight based on 100 parts by weight of the acrylic pressure-sensitive adhesive resin, but is not limited thereto. In another embodiment, the ratio of the isocyanate compound may be about 0.05 parts by weight or more, about 0.01 parts by weight or more, 0.1 parts by weight or more, 0.5 parts by weight or more or about 1 part by weight or more. In another embodiment, the ratio of the crosslinking agent may be 8 parts by weight or less, 6 parts by weight or less, 4 parts by weight or less or 3.5 parts by weight or less.

The cross-linkable composition may further include one or more additives, for example, selected from the group consisting of a silane coupling agent, a tackifier, an epoxy resin, a crosslinking agent, a UV light stabilizer, an antioxidant, a coloring agent, a reinforcing agent, a filler, an antifoaming agent, a surfactant and a plasticizer in addition to the aforementioned components.

The present application may relate to an exemplary cross-linkable composition, for example, a cross-linkable composition as a pressure-sensitive adhesive composition, and to a pressure-sensitive adhesive composition including an ionic liquid and a polymer with a glass transition temperature of 0° C. or less as a base polymer and further including a polyfunctional epoxy or aziridine compound and the polyalkylene polyol compound, where the base polymer is an acrylic pressure-sensitive adhesive resin having a carboxyl group.

The present application also relates to a pressure-sensitive adhesive optical member including an optical member; and a pressure-sensitive adhesive layer formed on one surface of the optical member. In the above description, the term "pressure-sensitive adhesive layer of a cross-linkable composition" refers to a pressure-sensitive adhesive layer formed of the cross-linkable composition, and for example, the pressure-sensitive adhesive layer may be formed by volatilizing an organic solvent from the aforementioned cross-linkable composition and crosslinking an acrylic pressure-sensitive adhesive resin. Also, in the above description, the pressure-sensitive adhesive optical member may refer to an optical member formed such that the optical member is attached to an adherend by the pressure-sensitive adhesive layer.

In the above description, for example, examples of the optical member include a polarizing film, a brightness enhancement film, a retardation film or the like without particular limitation, and a polarizing film may be representatively used.

In the above description, the type of the polarizing film is not particularly limited, and for example, a common type of a polarizing film known in the art such as a polyvinyl alcohol-based polarizing film or the like may be employed without limitation.

The polarizing film is a functional film capable of extracting only light oscillating in one direction from incident light oscillating in various directions. In such a polarizing film, for example, a dichroic dye may be adsorbed by and aligned with a polyvinylalcohol-based resin film. The polyvinylalcohol-based resin forming the polarizing film may be, for example, obtained by gelating a polyvinylacetate-based resin. In this case, the polyvinylacetate-based resin to be used may also include a copolymer of vinyl acetate and a monomer capable of being copolymerized with the vinyl acetate as well as a homopolymer of the vinyl acetate. The monomer capable of being copolymerized with the vinyl acetate may be, but is not limited to, one or a mixture of at least two of unsaturated carbonates, olefins, vinylethers, unsaturated sulfonates and acrylamides having an ammonium group. Generally, the degree of gelation of the polyvinylalcohol-based resin may be approximately 85 to 100 mol %, and preferably 98 mol % or more. The polyvinylalcohol-based resin may be further modified, and for example, may be polyvinylformal or polyvinylacetal modified with an aldehyde. Also, the degree of polymerization of the poylvinylalcohol-based resin may be about 1,000 to 10,000, or 1,500 to 5,000.

The polarizing film may be prepared through orienting a polyvinylalcohol-based resin film (e.g., uniaxial orientation), dying the polyvinylalcohol-based resin film with a dichroic dye, adsorbing the dichroic dye, treating the polyvinylalcohol-based resin film to which a dichroic dye is adsorbed with a boric acid aqueous solution, and then washing the polyvinylalcohol resin film. Here, as the dichroic dye, iodine or a dichroic organic pigment may be used.

When the optical member is a polarizing film, the optical member may further include a protective film attached to one or both surfaces of the polarizing film, and in this case, the pressure-sensitive adhesive layer may be formed on one surface of the protective film. The type of the protective film is not particularly limited, and examples thereof include a cellulose-based film such as a triacetyl cellulose (TAC) film; a polyester-based film such as a polycarbonate or poly (ethylene terephthalate) (PET) film; an acrylic film; a polyethersulfone-based film; and a film having a stacked structure having one or at least two of a polyethylene film, a polypropylene film and a polyolefin-based film prepared using a resin having a cyclo-based or norbornene structure or an ethylene-propylene copolymer.

In the present application, a method of forming a pressure-sensitive adhesive layer on the aforementioned optical member is not particularly limited, and for example, a method of preparing the pressure-sensitive adhesive may be applied, and a method of directly coating and curing a pressure-sensitive adhesive composition on the polarizing plate, or a method of coating and curing a pressure-sensitive adhesive composition on a release-treated surface of a releasable film and transferring the resulting composition to the polarizing plate may also be used.

A surface of the optical member to which the pressure-sensitive adhesive layer is attached may additionally include a surface-treated layer such as a corona-treated layer or a plasma-treated layer. The surface-treated layer has a hydroxyl group, which can increase interfacial adhesion by reacting with the isocyanate compound or the like.

The present application also relates to a display device to which the pressure-sensitive adhesive optical member as described above is attached. For example, the device may include a liquid crystal panel and the optical member attached to one or both surfaces of the liquid crystal panel.

As the liquid crystal panel, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertical alignment (VA) panel may be used. Particularly, when the aforementioned pressure-sensitive adhesive is applied, a VA mode liquid crystal panel may be effectively used as the liquid crystal panel.

Moreover, the type of other components of the liquid crystal display, for example, a color filter substrate or an upper and lower substrate such as an array substrate, is not particularly limited, and any component known in the art may be employed without limitation.

EFFECT

The present application relates to a cross-linkable composition. In an embodiment, the cross-linkable composition of the present application can form a membrane having an excellent interfacial adhesion with other layers and cause no detachment phenomenon when forming a membrane in a structure of a pressure-sensitive adhesive optical member or the like.

Embodiments

Hereinafter, the present invention will be explained in detail with reference to examples and comparative examples, but it is to be noted that the range of the pressure-sensitive adhesive composition is not limited to the following examples.

1. Infrared (IR) Spectrometry

Conditions for measuring an IR spectrum applied in the present specification are as follows. The spectrum baseline is air during the measurement.

<Measurement Conditions>

Measuring instrument: Agilent Cary 660 FTIR Spectrometer

ATR: PIKE Technologies 025-2018 Miracle ZnSe performance crystal plate

Measurement wavelength: 400 to 4000 nm

Measurement temperature: 25° C.

2. Evaluation of Molecular Weight

A weight average molecular weight (Mn) was measured under the following conditions using GPC. In preparing calibration curves, the measuring results were converted using standard polystyrene in an Agilent system.

<Measurement Conditions>

Measuring instrument: Agilent GPC (Agilent 1200 series, U.S.)

Column: connected two PL Mixed B

Column temperature: 40° C.

Eluent: tetrahydrofuran (THF)

Flow rate: 1.0 mL/min

Concentration: ~1 mg/mL (100 μL injection)

3. Measurement of Acid Value

An acid value was measured using an automatic titration device (COM-550, manufactured by HIRANUMA SANGYO Co., Ltd.), and calculated by the following equation:

$$A = \{(Y-X) \times f \times 5.611\}/M$$

A; an acid value

Y; a titration amount (ml) of a sample solution

X; a titration amount (ml) of a solution containing 50 g of a mixed solvent f; a factor of a titration solution M; a weight (g) of a polymer sample Measurement conditions were as follows.

Sample solution: prepared by dissolving about 0.5 g of a polymer sample in 50 g of a mixed solvent (toluene/2-propanol/distilled water=50/49.5/0.5, weight ratio)

Titration solution: 0.1N, 2-propanol-type potassium hydroxide solution (manufactured by Wako Junyaku Kogyo Co., Ltd., for test neutralization value of petroleum products)

Electrode: glass electrode, GE-101, Comparative electrode: RE-201

Measurement mode: for test neutralization value of petroleum products

4. Measurement of Octanol-Water Partition Coefficient

The octanol-water partition coefficient (Log P) was calculated using COSMOtherm (version C30_1301, COSMOlogic) which is a commercial thermodynamic program. The surface charge distribution of each compound and the difference in chemical potential of water and octanol was calculated using the program, and thereby the partition coefficient (Log P) was obtained. In this process, the BP_TZVP_C30_1301 parameterization was applied.

5. Measurement of Binding Energy

The binding energy was calculated using DMoL3 (Materials Studio DMoL3 version 6.1) which is a density functional theory (DFT) calculation package manufactured by BIOVIA. BP functional/DNP basis was used as a calculation level.

Two materials to be a target of the binding energy were modeled at a single molecule level to obtain the optimized structure of the case where two materials each exist in a gas phase and the case where they are bound, and a difference in energy of the two cases was calculated as a binding energy.

6. Measurement of Mixing Energy

The mixing energy was calculated using COSMOtherm (version C30_1301) which is a COSMO-RS theory calculation package and Turbomole (version 6.5) which is a DFT calculation package manufactured by COSMOlogic GmbH & Co. KG. In COSMOtherm, the BP_TZVP_C30_1301 parameterization was used, and BP functional/def-TZVP basis was used in Turbomole. Each material to be a target of the mixing energy was modeled at a single molecule level, and the optimum structure and surface screening charge were calculated in the environment in which the surrounding dielectric constant was infinite using a Turbomole package, and based on this, a difference between chemical potential in the case where each material independently exists and chemical potential in the case where they are mixed was calculated as a mixing energy. In the case of log P, a mixing energy was also calculated using COSMOtherm after the same process was carried out.

7. Measurement of Durability

A polarizing plate of examples or comparative examples was cut to a size of about 262 mm×about 465 mm (width× length) to prepare a specimen of two sheets, and two sheets of the specimen thus prepared were attached to both surfaces of a glass substrate with the optical absorbing axes of each polarizing plate crossed, thereby preparing a sample. The pressure applied on attaching was about 5 Kg/cm$^2$ and this work was performed in a clean room such that no bubbles or foreign material was introduced.

Durability of the sample was evaluated by heat resistant durability and moisture-heat resistant durability. The moisture-heat resistant durability was evaluated after leaving the sample at a temperature of 60° C. and a relative humidity of 90% for about 500 hours, and the heat resistant durability was evaluated after leaving the sample at a temperature of 80° C. for 500 hours.

The evaluation criteria of durability are as follows.

<Evaluation Criteria>

O: No bubbles and peeling observed when evaluating heat resistant and moisture-heat resistant durability Δ: A few bubbles and/or peeling observed when evaluating heat resistant and/or moisture-heat resistant durability X: Many bubbles and/or peeling observed when evaluating heat resistant and/or moisture-heat resistant durability 8. Measurement of Surface Resistance of Pressure-Sensitive Adhesive Layer The polarizing plate prepared in examples or comparative examples was left under room temperature conditions of 25° C. and 50% RH for 7 days and the surface resistance (initial surface resistance) was measured. The surface resistance was measured after removing a release film from the polarizing plate, and applying a voltage of 500 V for 1 minute under an environment of 23° C. and 50% RH using HIRESTA-UP (MCP-HT450; manufactured by Mitsubishi Chemical Corporation). The sample (pressure-sensitive adhesive polarizing plate) was left at 80° C. for 1,000 hours to measure the surface resistance of the sample in heat resistance conditions, and the sample (pressure-sensitive adhesive polarizing plate) was left at 60° C. and 90% RH for 1,000 hours to measure the surface resistance of the sample in hygrothermal resistance conditions. The samples left in heat resistance and hygrothermal resistance conditions as above were subjected to evaluation after leaving each specimen at room temperature for 24 hours.

9. Evaluation of Haze

The haze was evaluated by observing the condition of a coating solution with the naked eye just after coating the pressure-sensitive adhesive composition prepared in examples or comparative examples. The evaluation was conducted according to the following criteria.

<Evaluation Criteria>
O: No haze observed
Δ: Slight haze observed
X: Severe haze observed 10. Evaluation of Peel Strength The pressure-sensitive adhesive polarizing plate prepared in examples or comparative examples was cut to a size of 25 mm×120 mm (width×length) and attached to a glass substrate by the medium of a pressure-sensitive adhesive layer.

After 4 hours of attachment, the polarizing plate was gradually peeled from the glass substrate at a peeling angle of 180 degrees and a peeling speed of 300 mm/min to measure peel strength (initial peel strength). Furthermore, the polarizing plate was left at 50° C. for 4 hours after the attachment, and peel strength (50° C. peel strength) was measured in the same manner.

11. Evaluation of Substrate Adhesion

The substrate adhesion (adhesion between a pressure-sensitive adhesive layer and a polarizing plate protective film (TAC film)) of the pressure-sensitive adhesive polarizing plate was evaluated by the following method. A strong adhesive tape was first attached onto a surface of a pressure-sensitive adhesive layer formed on one surface of the pressure-sensitive adhesive polarizing plate. The strong adhesive tape was peeled from the pressure-sensitive adhesive polarizing plate within 1 minute after lamination, an amount of the pressure-sensitive adhesive layer remaining on a surface of the polarizing plate after peeling was measured and classified based on the following criteria.

<Evaluation Criteria>
O: Pressure-sensitive adhesive layer remained on 90% or more of the total area of the polarizing plate
Δ: Pressure-sensitive adhesive layer remained on 50% or more and less than 90% of the total area of the polarizing plate
X: Pressure-sensitive adhesive layer remained on less than 50% of the total area of the polarizing plate 12. Release Peel Strength at Room Temperature The pressure-sensitive adhesive polarizing plate prepared in examples or comparative examples was cut to a size of 50 mm×120 mm (width×length). Thereafter, a surface of the cut pressure-sensitive adhesive polarizing plate with no pressure-sensitive adhesive layer was attached to a glass substrate using double-sided tape. Then, a release film on the pressure-sensitive adhesive layer was peeled at a peeling angle of 180 degrees and a peeling speed of 300 mm/min to measure peel strength (initial peel strength).

Preparation Example 1

Preparation of Acrylic Pressure-Sensitive Adhesive Resin Solution

In a 1 L reactor with nitrogen gas refluxed and a cooling device installed to easily regulate a temperature, n-butyl acrylate (BA) and acrylic acid (AA) were introduced in a weight ratio (BA:AA) of 94:6, and ethyl acetate was also introduced therein as a solvent. Subsequently, oxygen was removed by purging with nitrogen gas for 1 hour, and a reaction initiator (AIBN: azobisisobutyronitrile) was introduced and reacted for about 8 hours. Then, the reactants were diluted with ethyl acetate to prepare an acrylic pressure-sensitive adhesive resin solution having an acid value in a range of about 32 to 34 and a weight average molecular weight of about 1,800,000.

Preparation Example 2

Preparation of Compound (A) of Formula 1

In a reactor with nitrogen gas refluxed and a heater, a cooling device and a thermometer installed to easily regulate a temperature, polyethylene glycol (PEG) with a weight average molecular weight of about 400 and isophorone diisocyanate (IPDI) were introduced in a weight ratio (PEG: IPDI) of about 5:2.8, and a temperature was slowly raised up to about 50° C. and maintained. In such a state, a mixture was uniformly mixed and reacted for about 1 hour. The reaction time was determined by an IR spectrum, and the reaction was continued until an area of an NCO peak found at 2,270 cm$^{-1}$ in an IR spectrum before reaction decreased to 50%.

Subsequently, the reactants were reacted with a polyol to prepare a compound (A) of Formula 1. In the above description, a polyol compound (HP-3753, manufactured by KPX CHEMICAL CO., LTD.) with a weight average molecular weight of approximately 7,000, which is a triol compound with three terminal hydroxyl groups including a polypropylene oxide unit at 85 wt % and a polyethylene oxide unit at 15 wt %, was used as the polyol.

The polyol compound, the reactants and catalyst (dibutyltin dilaurate) were mixed in a weight ratio (polyol compound:reactants:catalyst) of 92.1:7.8:0.003, and the mixture was gradually added dropwise into a reactor with a temperature maintained to about 60° C. and further reacted, thereby preparing the compound (A) of Formula 1. The reaction was continued until an NCO peak completely disappeared in an IR spectrum.

Figure 1:
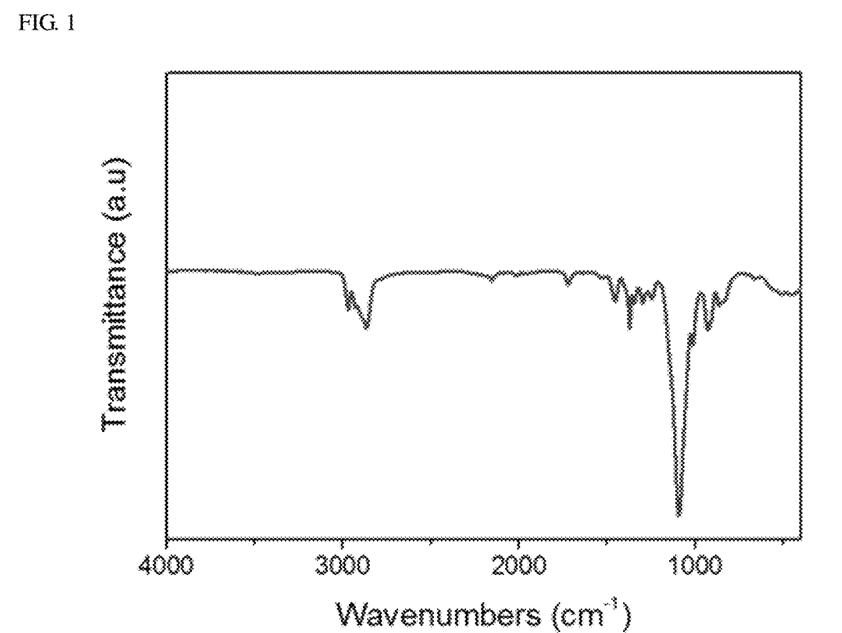
FIGS. 1 and 2 show infrared (IR) spectrum results for compounds prepared in Preparation Examples 2 and 3.

The compound (A) thus prepared had a molecular weight (Mw) of about 15,200 and a hydroxyl value (OHv) of about 11.2 mgKOH/g. The IR spectrum of the prepared compound is shown in FIG. 1.

Preparation Example 3

Preparation of Compound (B) of Formula 1

In a reactor with nitrogen gas refluxed and a heater, a cooling device and a thermometer installed to easily regulate a temperature, polyethylene glycol (PEG) with a weight average molecular weight of about 400 and isophorone diisocyanate (IPDI) were introduced in a weight ratio (PEG:

IPDI) of about 13.6:7.6, and a temperature was slowly raised up to about 50° C. and maintained. In such a state, a mixture was uniformly mixed and reacted for about 1 hour. The reaction time was determined by an IR spectrum, and the reaction was continued until an area of an NCO peak found at 2,270 cm$^{-1}$ in an IR spectrum before reaction decreased to 50%.

Subsequently, the reactants were reacted with a polyol to prepare a compound (A) of Formula 1. In the above description, a polyol compound (HP-3753, manufactured by KPX CHEMICAL CO., LTD.) with a weight average molecular weight of approximately 7,000, which is a triol compound with three terminal hydroxyl groups including a polypropylene oxide unit at 85 wt % and a polyethylene oxide unit at 15 wt %, was used as the polyol.

The polyol compound, the reactants and catalyst (dibutyltin dilaurate) were mixed in a weight ratio (polyol compound:reactants:catalyst) of 78.9:21.2:0.009, and the mixture was gradually added dropwise into a reactor with a temperature maintained to about 60° C. and further reacted, thereby preparing the compound (B) of Formula 1. The reaction was continued until an NCO peak completely disappeared in an IR spectrum.

Figure 2:
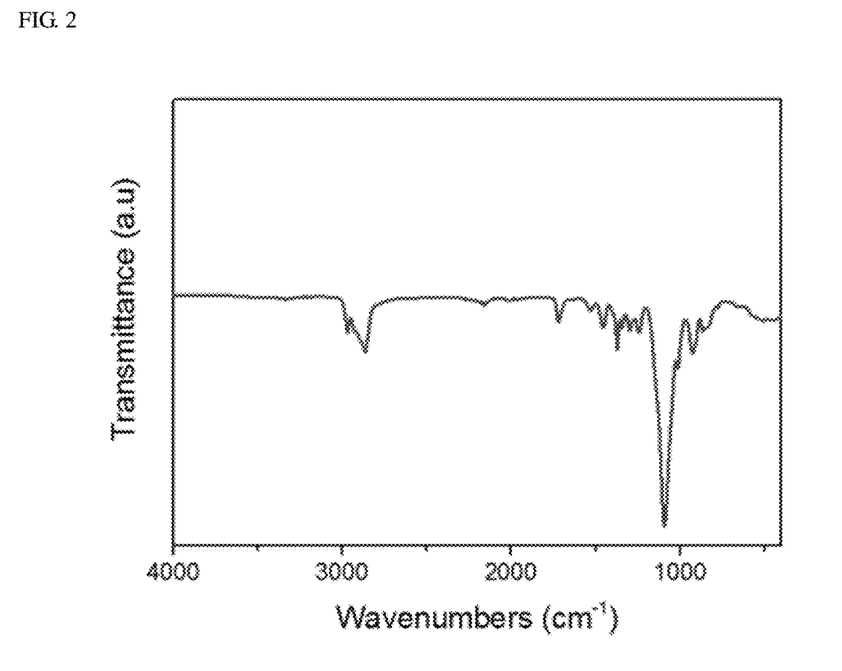

The compound (B) thus prepared had a molecular weight (Mw) of about 28,900 and a hydroxyl value (OHv) of about 5.61 mgKOH/g. The IR spectrum of the prepared compound is shown in FIG. 2.

Example 1

As an ionic compound, an ionic compound having methyl tributyl ammonium as a cation and trifluoromethanesulfonyl imide as an anion (octanol-water partition coefficient: about 5.65, cation-water binding energy: 0.45 Kcal/mol) was used. The ionic compound, the acrylic pressure-sensitive adhesive resin of Preparation Example 1, a crosslinking agent, the compound (A) of Preparation Example 2 and an isocyanate compound were mixed to prepare a cross-linkable composition. In the above description, an epoxy crosslinking agent (T-743L, manufactured by Nippon Soken Inc.) was used as the crosslinking agent, a compound (T-760B) prepared by addition polymerization of tolylene diisocyanate and trimethylolpropane was applied as the isocyanate compound. Based on 100 parts by weight of the solid content of the acrylic pressure-sensitive adhesive resin solution, 0.0052 parts by weight of the crosslinking agent, about 0.0793 parts by weight of the compound (A) of Preparation Example 2, about 4 parts by weight of the ionic compound and about 2 parts by weight of the isocyanate compound were mixed. The cross-linkable composition thus prepared was applied onto the release-treated surface of a release-treated poly (ethyleneterephthalate) (PET, MRF-38, manufactured by Mitsubishi Chemical Corporation) film and dried under suitable conditions to form a pressure-sensitive adhesive layer. The pressure-sensitive adhesive layer thus formed was laminated onto one surface of an iodine-based polarizing plate having a triacetyl cellulose (TAC)-based protective film attached to both surfaces thereof, thereby preparing a pressure-sensitive adhesive polarizing plate. The pressure-sensitive adhesive polarizing plate had a structure in which a pressure-sensitive adhesive layer and a release film were sequentially formed on a TAC film of one surface of a polarizing plate (TAC film/iodine-based polarizer/TAC film).

Example 2

A cross-linkable composition, a pressure-sensitive adhesive layer and a pressure-sensitive adhesive polarizing plate were prepared in the same manner as in Example 1 except that the compound (B) of Preparation Example 3 was used instead of the compound (A) of Preparation Example 2.

Example 3

A cross-linkable composition, a pressure-sensitive adhesive layer and a pressure-sensitive adhesive polarizing plate were prepared in the same manner as in Example 1 except that a polyol compound with a weight average molecular weight of approximately 7,000, which is a triol compound with three terminal hydroxyl groups including a polypropylene oxide unit at 85 wt % and a polyethylene oxide unit at 15 wt %, was applied as a polyalkylene glycol polyol instead of the compound (A).

Comparative Example 1

A cross-linkable composition, a pressure-sensitive adhesive layer and a pressure-sensitive adhesive polarizing plate were prepared in the same manner as in Example 1 except that the compound (A) of Preparation Example 2 was not used.

Comparative Example 2

A cross-linkable composition, a pressure-sensitive adhesive layer and a pressure-sensitive adhesive polarizing plate were prepared in the same manner as in Example 1 except that a polypropylene glycol having a weight average molecular weight of about 2,000 and two terminal hydroxyl groups was used instead of the compound (A) of Preparation Example 2.

Comparative Example 3

A cross-linkable composition, a pressure-sensitive adhesive layer and a pressure-sensitive adhesive polarizing plate were prepared in the same manner as in Example 1 except that a polypropylene glycol having a weight average molecular weight of about 6,000 and two terminal hydroxyl groups was used instead of the compound (A) of Preparation Example 2.

Comparative Example 4

A cross-linkable composition, a pressure-sensitive adhesive layer and a pressure-sensitive adhesive polarizing plate were prepared in the same manner as in Example 1 except that a polypropylene glycol having a weight average molecular weight of about 4,000 and three terminal hydroxyl groups was used instead of the compound (A) of Preparation Example 2.

Comparative Example 5

A cross-linkable composition, a pressure-sensitive adhesive layer and a pressure-sensitive adhesive polarizing plate were prepared in the same manner as in Example 1 except that a polypropylene glycol having a weight average molecular weight of about 5,000 and three terminal hydroxyl groups was used instead of the compound (A) of Preparation Example 2.

Comparative Example 6

A cross-linkable composition, a pressure-sensitive adhesive layer and a pressure-sensitive adhesive polarizing plate were prepared in the same manner as in Example 1 except that, as a known plasticizer, a plasticizer (L-7230) having a weight average molecular weight of about 29,000 and one terminal hydroxyl group was used instead of the compound (A) of Preparation Example 2.

Comparative Example 7

A cross-linkable composition, a pressure-sensitive adhesive layer and a pressure-sensitive adhesive polarizing plate were prepared in the same manner as in Example 1 except that a plasticizer (L-7230) having a weight average molecular weight of about 29,000 and one terminal hydroxyl group was used in a ratio of 0.00793 parts by weight.

The results of examples and comparative examples are summarized in the following Table 1.

TABLE 1

| | Example | | |
|---|---|---|---|
| | 1 | 2 | 3 |
| Binding energy (A) (units: Kcal/mol) | −9.46 | −8.99 | −9.48 |
| Binding energy (B) (units: Kcal/mol) | −6.50 | −6.50 | −6.50 |
| Mixing energy (units: Kcal/mol) | −0.95 | −0.95 | −0.95 |
| Substrate adhesion | ○ | ○ | ○ |
| Haze | ○ | ○ | ○ |
| Peel strength at room temperature (gf/25 mm) | 700 | 700 | 700 |
| 50° C. peel strength | 1,200 | 1,200 | 1,100 |
| Surface resistance (×10$^{10}$ Ω/□) | 5.3 | 5.2 | 5.9 |
| Release peel strength at room temperature (gf/25 mm) | 9.7 | 9.8 | 9.7 |
| Durability | ○ | ○ | ○ |

Binding energy (A): between polyalkylene polyol compound and acrylic pressure-sensitive adhesive resin
Binding energy (B): between crosslinking agent and acrylic pressure-sensitive adhesive resin
Mixing energy: between ionic compound and ethylene oxide unit

TABLE 2

| | Comparative Example | | | | | | |
|---|---|---|---|---|---|---|---|
| | 1 | 2 | 3 | 4 | 5 | 6 | 7 |
| Binding energy (A) | — | −7.84 | −7.92 | −8.02 | −8.25 | −8.19 | −8.19 |
| Binding energy (B) | — | −6.50 | −6.50 | −6.50 | −6.50 | −6.50 | −6.50 |
| Mixing energy | — | −0.95 | −0.95 | −0.95 | −0.95 | −0.95 | −0.95 |
| Substrate adhesion | X | X | Δ | Δ | Δ | X | Δ |
| Haze | ○ | ○ | ○ | ○ | ○ | ○ | ○ |
| Peel strength at room temperature (gf/25 mm) | 450 | 630 | 500 | 500 | 680 | 760 | 600 |
| 50° C. peel strength | 1,000 | 1,300 | 1,080 | 1,030 | 1,250 | 1,300 | 1,100 |
| Surface resistance (×10$^{10}$Ω/□) | 5.1 | 5.6 | 5.6 | 5.9 | 5.8 | 5.9 | 6.4 |
| Release peel strength at room temperature (gf/25 mm) | 13 | 7.6 | 9.7 | 7.9 | 10 | 25 | 11 |
| Durability | ○ | ○ | ○ | ○ | ○ | ○ | ○ |

Binding energy (A): between polyalkylene polyol compound and acrylic pressure-sensitive adhesive resin
Binding energy (B): between crosslinking agent and acrylic pressure-sensitive adhesive resin
Mixing energy: between ionic compound and ethylene oxide unit (unit: Kcal/mol)

What is claimed is:

1. A cross-linkable composition, comprising:

an acrylic pressure-sensitive adhesive resin having a carboxyl group;

a polyfunctional epoxy or aziridine compound; and a polyalkylene polyol compound which includes 3 or more hydroxyl groups, wherein the polyalkylene polyol compound is represented by the following Formula 1 and wherein the polyalkylene polyol compound has a weight average molecular weight of 30,000 or less:

[Formula 1]

where A is a core including a polyalkylene oxide unit, B is a chain represented by the following Formula 2, m is an integer of 1 or more, n is an integer of 0 or more, and the sum (m+n) of m and n is 3 or more:

[Formula 2]

where $A_1$ to $A_3$ each independently represent an alkylene group, $Q_1$ and $Q_2$ represent an aliphatic or aromatic divalent residue, $L_1$ to $L_4$ represent linkers, x is an integer of 1 or more, y is an integer of 0 or more, and z is an integer of 1 or more, and wherein the core (A) of the compound of Formula 1 includes a polyethylene oxide unit and a polypropylene oxide unit.

2. The cross-linkable composition of claim 1, wherein the acrylic pressure-sensitive adhesive resin having a carboxyl group has an acid value of 20 or more.

3. The cross-linkable composition of claim 1, wherein the core (A) of the compound of Formula 1 has the weight average molecular weight in a range of 1,000 to 10,000.

4. The cross-linkable composition of claim 1, wherein a ratio (P/E) of a number of moles (P) of the polypropylene oxide unit to a number of moles (E) of the polyethylene oxide unit in the core is in a range of 1 to 10.

5. The cross-linkable composition of claim 1, wherein each of the linkers of Formula 2 is an oxygen atom, a sulfur atom, an alkylene group, an alkenylene group or an alkynylene group, or is represented by the following Formula 4 or 5:

[Formula 4]

$$-O-\overset{O}{\underset{}{\overset{\|}{C}}}-\underset{R_1}{\overset{}{N}}-$$

[Formula 5]

$$\underset{R_2}{\overset{}{N}}-\overset{}{\underset{O}{\overset{\|}{C}}}-$$

where $R_1$ and $R_2$ each independently represent a hydrogen atom or an alkyl group.

6. The cross-linkable composition of claim 1, further comprising an ionic compound.

7. The cross-linkable composition of claim 6, wherein the ionic compound has an octanol-water partition coefficient of 4 or more.

8. The cross-linkable composition of claim 6, wherein the ionic compound has a cation-water binding energy in a range of 0 to 0.6 Kcal/mol.

9. The cross-linkable composition of claim 1, further comprising an isocyanate compound.

10. A pressure-sensitive adhesive composition, comprising an ionic liquid and a polymer with a glass transition temperature of 0° C. or less as a base polymer, wherein the base polymer is an acrylic pressure-sensitive adhesive resin having a carboxyl group, and the pressure-sensitive adhesive composition further includes:

a polyfunctional epoxy or aziridine compound; and a polyalkylene polyol compound of the following Formula 1, wherein the polyalkylene polyol compound has a weight average molecular weight of 30,000 or less:

[Formula 1]

$$(HO\!\!-\!\!)_n\!-\!A\!-\!(\!-\!B)_m$$

where A is a core including a polyalkylene oxide unit, B is a chain represented by the following Formula 2, m is an integer of 1 or more, n is an integer of 0 or more, and the sum (m+n) of m and n is 3 or more:

[Formula 2]

$$-\!\!\left[L_1\!-\!Q_1\!-\!L_2\!-\!\!\left[O\!-\!A_1\right]_x\!\!-\!L_3\!-\!Q_2\!-\!L_4\!-\!\left[A_2\!-\!O\right]_z\!-\!A_3\!-\!OH\right]_y$$

where $A_1$ to $A_3$ each independently represent an alkylene group, $Q_1$ and $Q_2$ represent an aliphatic or aromatic divalent residue, $L_1$ to $L_4$ represent linkers, x is an integer of 1 or more, y is an integer of 0 or more, and z is an integer of 1 or more, and wherein the core (A) of the compound of Formula 1 includes a polyethylene oxide unit and a polypropylene oxide unit.

* * * * *